Figure 1:
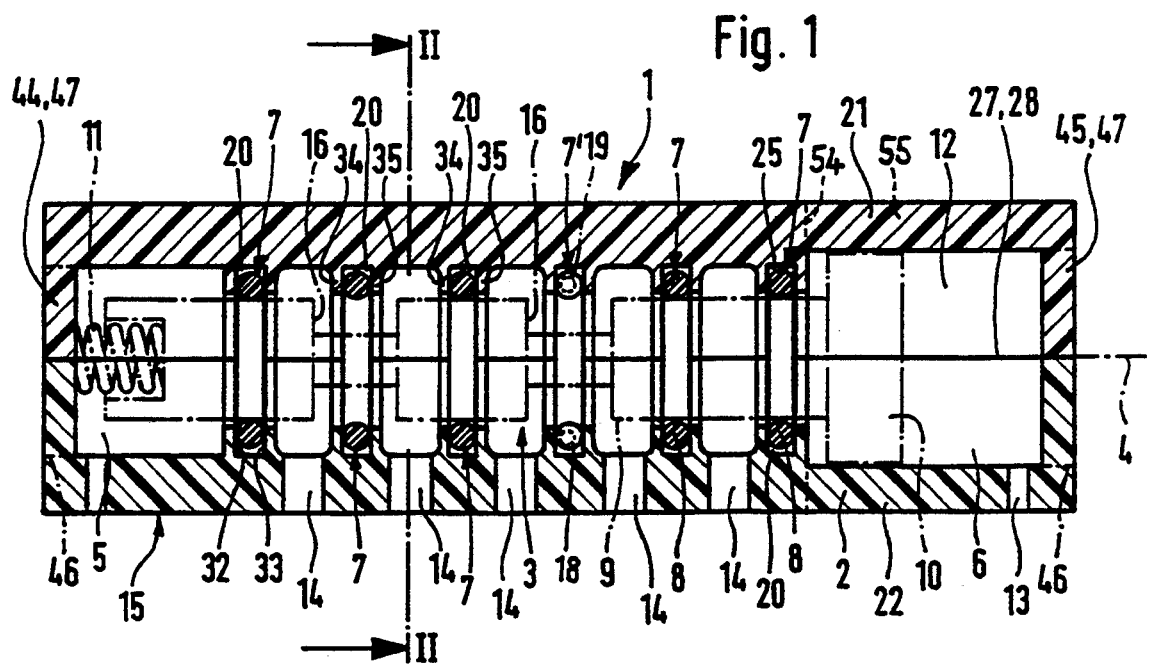

United States Patent [19]

Stoll

[11] Patent Number: 5,361,803
[45] Date of Patent: Nov. 8, 1994

[54] SPOOL VALVE
[75] Inventor: Kurt Stoll, Esslingen, Germany
[73] Assignee: Festo KG, Esslingen, Germany
[21] Appl. No.: 88,760
[22] Filed: Jul. 8, 1993
[30] Foreign Application Priority Data
Jul. 16, 1992 [DE] Germany .............................. 4223358
[51] Int. Cl.$^5$ .......................... F16K 3/24; F15B 13/04
[52] U.S. Cl. ..................... 137/625.66; 137/625.69; 251/367; 251/900
[58] Field of Search ...................... 137/625.66, 625.69; 251/367, 900

[56] References Cited
U.S. PATENT DOCUMENTS
3,153,550 10/1964 Hollett .

FOREIGN PATENT DOCUMENTS
0033303A1  8/1981  European Pat. Off. .
0122247B1 10/1984  European Pat. Off. .
3641383A1  6/1987  Germany .
8607094U1 11/1989  Germany .
4027520C2  3/1992  Germany .

Primary Examiner—Gerald A. Michalsky
Attorney, Agent, or Firm—Hoffmann & Baron

[57] ABSTRACT

A spool valve having a valve housing with an internal spool receiving space, in which a valve spool is arranged. A plurality of sealing rings are arranged in axial sequence. Such sealing rings are retained in holding recesses, which are formed integrally with the valve housing. The valve housing is itself longitudinally divided and is composed of a plurality of housing parts which respectively constitute a wall section, extending for some distance in the peripheral direction, of the spool receiving space including the associated peripheral sections of the holding recesses. It is in this manner that the sealing rings may be inserted into the spool receiving space without any difficulty in the separated condition of the housing parts, whereafter the housing parts only have to be fitted together.

20 Claims, 2 Drawing Sheets

SPOOL VALVE

BACKGROUND OF THE INVENTION

The invention relates to a spool valve comprising a valve housing, in the interior of which an axially extending spool receiving space is provided, in which a valve spool is arranged, the valve housing being longitudinally divided in the area of the spool receiving space with the formation of a plurality of longitudinally extending housing parts, and a plurality of sealing rings which are in direct sealing contact with the valve spool so as to define flow paths and which are arranged coaxially in relation to the valve spool in an axial sequence with a spacing in relation to one another.

Such a valve is known, see the European patent publication 0 122 247 B1. It has a valve housing in whose interior space a sleeve is arranged, which functions as a spool receiving space and receives valve spool for longitudinal sliding motion. For the insertion or the sleeve and of the valve spool the valve housing is longitudinally divided into two halves for the extent of the spool receiving space. The sleeve has peripheral holes via which the valve ducts are in communication with the spool receiving space so that different flow paths may be predetermined for the fluid in the valve in a manner dependent on the setting of the spool. In order to prevent the fluid from flowing in an uncontrolled manner between the sleeve and the valve spool in the longitudinal direction, the valve spool has a plurality of annular seals, which are able to slide on the inner periphery or bore of the sleeve while in tight sealing engagement therewith.

Because the spool receiving space is defined by the sleeve there is the advantage of a satisfactory guiding action and the possibility of the arrangement and formation of choke openings which under operational conditions are to prevent sharp pressure surges, but there is the disadvantage that there has to be a static seal between the valve housing and the sleeve in order to prevent longitudinal flow of fluid in the part radially extending between the housing parts and the sleeve. The sealing action is produced by means of sealing rings, which are seated in grooves in the housing parts and coaxially surround the sleeve at a plurality of positions. The assembly and insertion of the sleeve is relatively complex, since it has to be fitted with the sealing rings prior to placing it in the housing halves, this being particularly difficult if such rings are, as is provided for, designed with a housing seal operating between the housing parts. In addition to the extra design complexity owing to the sleeve there is furthermore an increase in the danger of possible leaks, since the radial sealing action which is necessary both internally and externally, calls for a substantial number of sealing joints. Moreover the sealing rings necessary for predetermining the flow paths and in direct sealing contact with the valve spool are snapped into grooves in the valve spool with the result that during the assembly thereof they can be subject to damage to the extent that they may be overstretched on slipping them on the valve spool or because they have to be slid over preceding receiving grooves prior to reaching the groove inside the spool for which they are in fact intended and during such sliding motion have to be dragged over sharp groove edges.

In order to deal with such problems as described there has already been a proposal in the German patent publication 4,027,520 C2 to design the sealing rings in the form of cartridge-like units, which are separately inserted into the spool receiving space of a valve housing which is shut off peripherally. However this calls for relatively complex positioning measures and extremely accurate matching between relationships between the tolerances of the part. A further known alternative possibility provided in the German patent publication 3,641,383 A1 is to have a peripherally closed valve housing with transverse slots, into which the sealing rings are inserted so that they assume positions in the spool receiving space where they can cooperate with the spool valve which in this case has no seals. The openings of the insertion slots are covered over by means of a cover plate which is mounted on the outside of the valve housing. On insertion of the spool valve it is possible the sealing rings to be damaged, since are not accessible at all. Furthermore as in this case of the said German patent publication 4,027,520 C2 there is no possibility, in the case of a valve with small overall dimensions, to check the workmanship of the spool receiving space.

SHORT SUMMARY OF THE INVENTION

Accordingly on the basis of the spool valve of the type initially mentioned there is the need to be able to design a spool valve which while having a low-cost structure and a reduction in the possibility of damage to the sealing rings, is able to be simply, quickly and accurately assembled.

In order to achieve these or other purposes, in the present invention the housing parts, divided by the longitudinal separation, of the valve housing, respectively constitute one wall section, which extends some distance in the peripheral direction of the valve spool, of the valve spool receiving space and the sealing rings provided for direct sealing contact with the valve spool are held in annular holding recesses, formed directly in the longitudinally divided valve housing, in a manner which is fixed in relation to the housing, such recesses being composed of peripheral sections formed on the wall sections of the spool receiving space constituted by the individual housing parts.

In the case of the spool valve designed in this manner there is a simplification of the valve structure while simultaneously reducing the costs of manufacture, since there is no longer a separate sleeve defining the spool receiving space. The spool receiving space is directly formed by the parts which are present owing to the longitudinal separation, the wall sections thereof being assembled to give the peripheral wall of the spool receiving space. Therefore there is no longer any need for additional sealing or gasket rings which only act statically, in the part between the valve spool and the valve housing with the result that the number of seals, which may give rise to problems, is reduced. The sealing rings needed for direct sealing contact with the valve spool are accommodated in annular holding recesses, which are a component of the valve housing so that they are in direct dynamic sealing contact with the valve spool. The arrangement is such that the housing parts delimiting the spool receiving space respectively form one peripheral section of a respective holding recess, the mutually associated peripheral sections fitting together to give an annular configuration. It is therefore no longer necessary to snap fit the sealing rings in the grooves in the valve spool or design them in a multi-part form so that it is possible to prevent damage during assembly and it is furthermore possible to have a valve spool with a relatively simple structure. Moreover it is possible to ensure that the sealing rings are not subjected to any disproportional wear at their dynamically loaded areas. If the sealing rings were to be left on the valve spool, it would then be necessary to machine the spool receiving space after assembly of the housing parts in order to ensure a neat transition in the housing part swept by the sealing rings and thus to reduce wear.

Although the said European patent publication 0 122 247 B1 discloses a valve with the possibility of, in principle, omitting the sleeve, since the sealing rings arranged between the valve housing and the sleeve only serve the purpose of statically sealing off the sleeve from the valve housing, the sealing rings, including the recesses in the housing for receiving them, would not be present either in a correspondingly modified valve. They would in fact necessarily have to be left out, since otherwise there would be an undesired contact with the sealing rings fixed on the spool. Owing to their purely static sealing action they are not designed for a dynamic sealing engagement with the moving valve spool. All in all there would consequently be the same disadvantages and problems as have already been described in the above. It is furthermore to be noted that the sleeve in the case of the European patent publication 0 122 247 B1 furthermore has the purpose of predetermining choke openings which are operated by the seal of the valve spool for this purpose of gently building up pressure so that it would not be obvious in this respect to fix the sealing rings in the valve in question on the housing.

The European patent publication 0 033 303 A1 as well discloses a valve with a longitudinally divided housing, it clearly being a question of the a valve of the same type as in the European patent publication 0 122 247 B1. As in the latter case there is a cylindrical sleeve, which radially inside cooperates with sealing rings secured to the valve spool and radially outwards cooperates with a sealing ring arrangement secured to the housing.

The U.S. Pat. No. 3,153,550 relates to a pipe coupling or joint in the case of which statically operating sealing rings are exclusively provided, which unlike sealing rings in valves are not subjected to any dynamic loads. It is not to be expected that a man in the art considering a modification of a valve would taken into account the non-related art of pipe couplings.

The German patent publication 8 607 094 U1 describes a valve, which is as well characterized by a divided valve housing. However here it is a question of a different type of valve, that is to say a piezoelectrically operated valve which has neither a valve spool nor a spool receiving space and accordingly does not have any sealing rings arranged between the two parts.

Further advantageous forms of the invention are recited in the claims.

It is preferred for the valve housing to be composed of two and only two longitudinally divided housing parts, the wall sections constituted by them preferably occupying one half of the periphery. It is in such a design that the insertion of the sealing rings is particularly simple, since the cross section opened and available for insertion into the spaces in each housing part is at an optimum.

Adjacent to their joins with each other the housing parts may be permanently fixed together, for example by adhesive or by welding. Furthermore it is possible to connect the housing parts detachably with one another, for instance by screw means, by clipping together or by clamping together. More particularly in the case of a detachable connection it is preferred to provide housing seals at the joints. Such sealing means should however be so arranged that the housing parts are able to be thrust firmly together at their contact surface and there is an exactly reproducible assembly dimension. In connection with this it is convenient for the contact surfaces of the housing system to be machined to maximum accuracy, for example by lapping.

In accordance with a further advantageous development which is low in price to produce, the housing parts consist of synthetic resin material. It may be a question of cast or molded parts, injection molded parts being preferred. The holding recesses or, respectively, the peripheral sections thereof may during molding be directly formed on as well so that expensive later working is unnecessary.

More particularly in order to obtain larger flow cross sections it may be expedient to provide the lateral limiting surfaces of the holding recesses on radially extending radial projections, which extend radially into the spool receiving space and extend in the peripheral direction of the spool receiving space, of the housing part so that between mutually adjacent radial projections axially adjacent holding recesses are produced, which ensure a satisfactory flow through the valve and are very efficient as regards the connection of the valve ducts, which in the case of spool valves open with an axial clearance into the spool receiving space.

It is possible to coaxially insert a centering disk into the spool receiving space or in at least one housing space adjoining the same coaxially and which for example is provided for a valve spool, a restoring spring or another control element, such centering disk functioning to align the housing parts to be fitted together. It is preferred for the at least one centering disk to constitute a terminal cover plate of the valve housing.

The valve housing may all in all only comprise two housing parts. However it is possible to provide a separate and more particularly a removable housing cover on one or each of the two ends. Although it is possible to mount the valve spool, in the case of there being separate housing parts, simultaneously with the sealing rings or following the sealing rings, but however the possibility of access present after the assembly of the housing parts via a housing opening at one end may prove advantageous. In the case of there being a detachable closing means any necessary servicing will be facilitated.

The valve spool, which may also be termed a round spool, preferably has a circular cross section.

Further advantageous developments and convenient forms of the invention will be understood from the following detailed descriptive disclosure in conjunction with the accompanying drawings.

LIST OF THE SEVERAL VIEWS OF THE FIGURES

Figure 2:
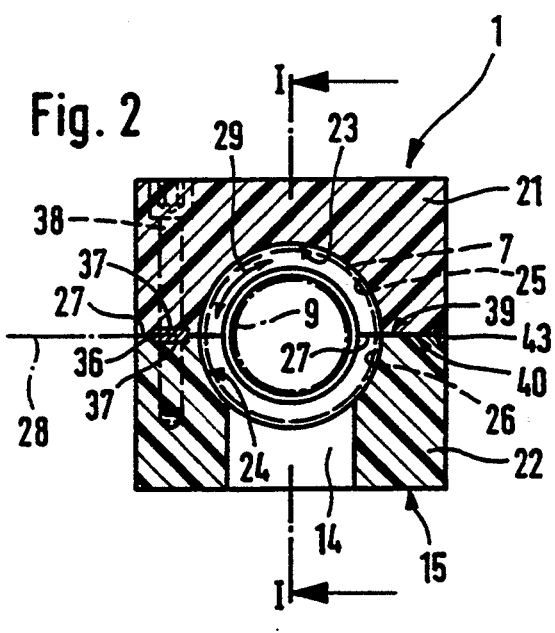

FIG. 1 shows a preferred working embodiment of the spool valve in a longitudinal section taken on the section line I—I in FIG. 2, the valve spool and some further parts of the valve being indicated in broken lines.

FIG. 2 and

Figure 3:
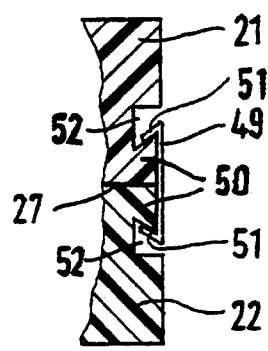

FIG. 3 show the spool valve in accordance with FIG. 1 in a cross section taken on the section line II—II, different possibilities of connection being indicated for the two housing parts.

DETAILED ACCOUNT OF WORKING EMBODIMENTS OF THE INVENTION

The spool valve 1 comprises a valve housing 2 which more particularly has a rectangular external configuration. In the interior of the valve housing 2 there is a cavity or spool receiving space 3 which has a longitudinal form and extends in the direction of the longitudinal axis 4 of the valve housing 2. As an axial extension thereof there is at each end of the spool receiving space 3 an additional, coaxially arranged housing space 5 and 6. The housing spaces 5 and 6 as well are in the interior of the valve housing 2, although in the case of certain design modifications they could furthermore be components of additional housings arranged at the ends of the valve housing.

In the spool receiving space 3 there are a plurality of sealing rings 7 arranged in an axial sequence with coaxial alignment. The spool valve 1 of the present working embodiment is a five-way valve so that it is an advantage if in all six sealing rings 7 are provided. In the case of the latter it is preferably a question of so-called soft seals which have a single annular sealing body 8 of soft elastic synthetic resin material and more particularly of an elastomer.

A valve spool 9, which may also be termed a round spool or piston, and which in order to make the drawing more straightforward is shown in broken lines, extends coaxially in the spool receiving space 3. It extends through all sealing rings 7 and may be reciprocated in the direction of the longitudinal axis 4. For this purpose it is provided at its end with an actuating piston 10, which is accommodated in one of the above mentioned housing spaces 6 for axial motion. However instead of the actuating piston 10 it would be possible to have a different control of drive element for example a diaphragm-like part. In the opposite housing space 5 a returning device 11 is accommodated, which for example consists of a compression spring arrangement having its two ends bearing against the associated end of the valve spool 9 and the valve housing 2.

In order to move the valve spool 9 to the left the control chamber 12 of the housing space 6, which is on the right of the actuating piston 10, is supplied with drive fluid, more particularly compressed air, through a control opening 13 in the valve housing 2. The return movement is caused when the control chamber is vented owing to the return force of the return device 11. As a matter of principle it is possible for the switching motion of the valve spool 9 to be caused in some other way as well.

Valve ducts 14 open peripherally into the intermediate part, arranged between axially staggered sealing rings 7, of the spool receiving space 3. At their other ends they lead to in outer connection side 15 of the valve housing 2, where fluid line or ducts (not illustrated) may be connected which lead on to other parts of a system. It is convenient if the spool valve 1 is mounted on a fluid power connection or distribution block, with a suitable intermediate gasket, which block contains the necessary fluid ducts. It is furthermore possible to provide electrical control lines if it is desired to cause operation of the valve spool by means of electrically actuated pilot valves.

The valve spool may furthermore be termed a round spool or piston. In the working embodiment it has a circularly cylindrical configuration with circumferentially extending control grooves 16 arranged with an axial spacing therebetween. Given a suitable setting of the valve spool 9 such control grooves 16 render possible a fluid power connection to be made between axially adjacent valve ducts 14, whereas the piston part adjacent to the control grooves 16 cooperate with the sealing rings 7 and prevent the passage of fluid. Since the basic design of spool valves and the manner of operating them is generally known, there is no need to provide further details thereof here.

The sealing rings 7 are locked in holding recesses 20 which are an inherent component of the valve housing 2. The holding recesses 20 and the valve housing 2 are made integrally with each other. An additional sleeve arrangement, arranged between the valve housing 2 and the valve spool 9 to act as a sealing ring carrier, is consequently not required, something which simplifies the structure and reduces manufacturing costs.

A particular advantage of the spool valve 1 is due to the longitudinal division of the valve housing 2. The same is composed of a plurality of housing parts 21 and 22 which each form a wall section 23 and 24 extending some distance in the peripheral direction (as indicated by the double arrow 29) including the associated circumferential section 25 and 26 of the holding recesses 20 and otherwise extend without transverse division at least along the length of the spool receiving space, and a preferably however along the entire length of the valve housing.

The arrangement illustrated is advantageous with the feature that the valve housing 2 consists of two housing parts 21 and 22 with the result that the wall sections 23 and 24 constituted by them respectively extend along one circumferential half of the spool receiving space 3. The same also goes for the peripheral sections 25 and 26. It would be possible to speak of a semi-shell construction.

Each housing part 21 and 22 thus delimits part of the spool receiving space 3, the two spaces so delimited running together in the assembled state of the housing parts 21 and 22 to form the spool receiving space 3. The arcuate length of the wall section 23 and 24 and furthermore the peripheral sections 25 and 26 in this case corresponds to an angle of 180°. The joins 27 extending between the housing parts 21 and 22 are preferably also in a parting plane 28 which extends both in the direction of the longitudinal axis and also in the radial direction. The valve housing 2 is hence practically divided into two housing halves, the valve ducts 14 being provided in only one of the housing halves (viz. the housing part 22) so that the other housing part 21 may be designed without any ducts.

The holding recesses 20 can be cut into the inner surface or bore of the wall sections 23 and 24 like grooves so that the intermediate parts between them of the spool receiving space 3 have a constant diameter along the entire axial length. However as regards flow properties it is better, more particularly in the case of valves having a relatively small overall size if the lateral limiting surfaces 32 and 33 of the individual holding recesses 20 are provided on radial projections 34 and 35 extending into the spool receiving space 3 and furthermore extending in the peripheral direction 29 of the spool receiving space 3, such projections furthermore fitting together in the assembled state of the housing parts 21 and 22 to give a ring-like structure, which locally constitutes a concentric narrower part or neck in the spool receiving space 3. The latter is the case in the illustrated working embodiment with the result that between individual, directly adjacent radial projections 34 and 35 of sequentially arranged holding recesses 20 annular radial cutouts are produced into which the valve ducts 14 open and which ensure an optimum flow through the valve.

The housing parts 21 and 22 of the working embodiment consist of synthetic resin material and are produced by molding, more particularly injection molding. The holding recesses 20 and, respectively, the emission projections 34 and 35 are produced directly in a single piece. In comparison with subsequent machining to produce the holding recesses and/or production in metal, which in principle would also be possible, of the housing parts 21 and 22, such chipless manufacture leads to substantial savings as regards manufacturing costs and the complexity of the tools required.

On assembly of the spool valve firstly the two housing parts 21 and 22 are made as separate components. Therefore the spool receiving space 3 is circumferentially open and it is possible to insert the sealing rings 7 into the peripheral sections 25 and, respectively, 26 on one or the other housing part 21 and 22. This has an advantage of open assembly, that is to say assembly performed by eye with the parts exposed In this respect the direction or insertion rings transversely and more particularly at a right angle to the longitudinal axis 4. There is then an intermediate spacing or distance, in which the sealing rings 7 have half their periphery inserted into the peripheral sections 25 or 26 of the one housing part 21 or, respectively, 2, whereas the remaining parts of the sealing rings projecting past the respective housing part. The respectively other housing part is now placed, with the open side of the associated part of the space, against the housing part with the sealing rings 7, the sealing rings 7 now also slipping into the peripheral sections, provided in the placed-on housing half, of the holding recesses. As is clear the sealing rings 7 can be arranged rapidly and accurately and without an substantial deformation in the desired positions. It is consequently only necessary to abide by a few tight tolerances and furthermore the requirements as regards surface roughness are reduced.

It is to be ensured that the two housing halves 21 and 22 are connected together in a sealing manner at their joins 27. For this purpose it is an advantage if between the housing parts 21 and 22 adjacent to joins 27 housing seals 36 are arranged in between, as will be seen in the left half of the FIG. 2 by way of example. In order to ensure, after assembly that the radial dimensions and the roundness of the spool receiving space 3 are ensured in the desired manner, the housing seals 36 should be so arranged that they still make possible a direct contact between the two housing halves 21 and 2. It is convenient for the housing seals 36 in this respect to be seated in grooves 37 in the housing, which have been machined along the joins 27 in one or both housing halves 21 and 22. This means that on assembly the housing parts 21 and 22 can be firmly thrust together transversely without yielding housing seals affecting the overall height, as measured transversely in relation to the parting plane 28, of the assembled valve housing 2.

In order to provide a firm joint between them it is possible for the housing parts 21 and 22 to be screwed together. As an example therefor in the left hand half of the FIG. 2 a corresponding holding screw 38 is shown in broken lines. As seen in plan view looking towards the top side opposite to the valve duct, of the valve housing 1, it is to be recommended, at least in all four corner parts, to provide a holding screw 38, which extends transversely in relation to the parting plane 28 in the two housing parts 21 and 22.

A further possibility for clamping the housing parts 21 and 22 firmly together is the use or clip means. In the case of this type of fastening as shown in FIG. 3 one or a plurality of clips 49 are provided consisting of, more particularly, resiliently elastic material, which clips are anchored on the one hand on one (21) and on the other hand on the other (22) housing part. It is convenient in this respect if such respective housing part 21 and 22 has, adjacent to the join, a plurality of holding parts 50, around which the clips 49 fit. For instance the holding parts 50 are constituted by the wall sections, facing the join 27, of longitudinal recesses 52, which are machined in the outer surface of the housing parts 21 and 22. For instance the longitudinal recesses 52 may extend along the entire length of the valve housing 2 with the result that on each of the two outer lateral, having the joins, of the valve housing 2 a respective single clip 49 can be arranged, which more particularly also extends along the entire length of the housing. If desired it is possible to do without clips arranged adjacent to the end of the housing. It is possible to the design the clip connection so as to be detachable like the already mentioned screw connection.

It is furthermore certainly possible to arrange the housing parts 21 and 22 permanently so that they are permanently joined together. In this case they will be bonded or welded together adjacent to the joints 27. A weldment is depicted in the right half of FIG. 2, where the weld 43 will be seen. It is desired to use laser welding. The weldment 43 preferably extends along the entire periphery of the joins 27 so that a sealing function is performed too.

In order to exactly fit the two housing parts 21 and 22 together, the contact surfaces 39 and 40 which in the assembled state rest against each other should be exactly machined and preferably such contact surfaces will be lapped.

It will be clear that for one single spool valve there is only one type of connection between the housing halves 21 and 22 and FIGS. 2 and 3 are merely intended to indicate the different possibilities conveniently.

The external end terminations or the two housing spaces 5 and 6 constituted by the housing covers 44 and 45, which are integral components of the housing parts 21 and 22. Furthermore the housing covers 44 and 45 are involved in the longitudinal division so that they are each molded in respective halves in the two housing parts 21 and 22. Consequently in the divided state there are two box-like housing parts 21 and 22, which each have one bottom wall and two respective longitudinal walls and two transverse side walls and which are assembled with their open side opposite the bottom wall together. The contact surfaces 39 and 40 are in this respect constituted by the peripheral edges of the side walls.

Each respective housing cover may be furthermore constituted by an additional housing 55, which in the part 54 shown in broken lines is placed endways against the valve housing and receives one of the control elements 10 and 11.

However it is possible as well for at least one of the end housing covers 44 and 45 to be designed in the form of a separate component. While in the case of the illustrated working embodiment the valve spool 9 and the remaining components necessary for actuating the same are to be installed prior to the assembly of the two housing parts 21 and 22, in the case of at least one separate housing cover 44 and 45 the insertion of the said parts may furthermore take place after the assembly of the housing parts 21 and 22 by endwise insertion. In the case of a detachable attachment of the housing covers 44 and 45 in addition to this subsequent servicing operations would also be possible.

Separate housing covers 44 and 45 are conveniently, as shown in FIG. 1 at 46, at least partly coaxially inserted into the interior of the associated housing space 5 or 6. It is in this manner that they simultaneously function as centering parts 47, which set an accurate relative setting between the assembled housing parts 21 and 22. For this reason other centering means or centering measures are unnecessary, be it by means of some form of centering pin or by means of particular assembly jigs. It will be clear that the centering parts 47 do not simultaneously have to be the housing covers 44 and 45 and it may be a question of additional parts, which are arranged at a suitable position in a housing space 5 and 6 and/or in the spool receiving space 3. Such centering parts, which are preferably disk-like in design—dependent on the position of assembly with or without a central opening—may like the sealing rings 7 furthermore be inserted prior to the assembly of the housing parts 21 and 22 from the side. If sealing rings are employed with their own rigid housing, the same may in certain circumstances function as the centering parts.

In the case of the working embodiment the separate and unconnected sealing rings 7 are in sealing cooperation both with the valve housing 2 and also with the valve spool 9 so that only a small number of sealing rings is required. As sealing rings O-ring seals are employed in the working embodiment, which have a more particularly circular sealing body cross section. It will be apparent however that other types of single- or multi-part sealing rings can be utilized, for example sealing rings with a multiplicity of concentrically arranged sealing bodies or lip sealing rings. It is more particularly an advantage to employ individual sealing rings 7', which respectively have an annular sealing body 18 of elastic material, which preferably is provided with a support ring 19 in that part, which after assembly is in a coaxially arranged holding recess 20, such ring consisting of for instance metal and being coaxially arranged. This ring is preferably embedded in the sealing body 18 or is at least partly set in it so that it is partly or completely taken up in the sealing body 18. It ensures that there is a certain structural stiffness of the individual sealing ring 7', something that both simplifies the assembly thereof and furthermore improves its retention in the holding recess 20. A suitable design is indicated in FIG. 1 at 7', the sealing body 18, which is not shown in broken lines in order to make the drawing more straightforward here having a circular cross section. The sealing body 18 might preferably however have an elongated cross section as well, its radially outer holding section, which has the support ring 19, being seated in the holding recess 20, and having a more particularly tapering sealing part projecting radially inwards and cooperating with the valve spool 9.

The number of sealing rings and corresponding recesses employed per spool valve will be dependent on the type of the respective valve and may be varied without any difficulty. The working embodiment provides a five-way valve with a very small number of components: if the actuating parts are ignored, there are merely two housing halves, one valve spool and six sealing rings.

As mentioned initially the means 10 and 11 necessary for actuating and/or returning back into the initial position, by certainly be accommodated in separate housing parts, which are not necessarily longitudinally divided. The significant point is that the longitudinal division extends at least to the housing component, which accommodates the sealing rings 7 cooperating with the valve spool 9 and whose assembly is substantially simplified by the longitudinal division.

The valve shown by way of example is very well suited for automated assembly with a reduced manpower. In comparison with the prior art as mentioned already, it is possible to achieve a reduction in assembly time of approximately 40%. A substantially smaller number of parts is to be handled. Furthermore the investment for assembly equipment is approximately 70% less. The selection of the materials for the housing parts leads to many different possibilities dependent on the purpose of application. In addition to synthetic resins a metal design would also be possible, for instance using a zinc alloy. Since there is no deburring of grooves arid hole there is very high functional reliability.

I claim:

1. A spool valve comprising a valve housing, in the interior of which an axially extending spool receiving space is provided, in which a valve spool is arranged, the valve housing being longitudinally divided in the area of the spool receiving space with the formation of a plurality of longitudinally extending housing parts, and a plurality of sealing rings which are in direct sealing contact with the valve spool so as to define flow paths and which are arranged coaxially in relation to the valve spool in an axial sequence with a spacing in relation to one another, wherein the housing parts, provided by the longitudinal separation, of the valve housing, respectively constitute one wall section, which extends some distance in the peripheral direction of the valve spool, of the valve spool receiving space and the sealing rings provided for direct sealing contact with the valve spool are held in annular holding recesses, formed directly in the longitudinally divided valve housing, in a manner which is fixed in relation to the housing, such recesses being composed of peripheral sections formed on the wall sections of the spool receiving space constituted by the individual housing parts.

2. The spool valve as claimed in claim 1, wherein the valve housing is composed of two longitudinally extending housing parts.

3. The spool valve as claimed in claim 1, wherein the two wall sections constituted by the housing parts respectively constitute one half of the peripheral extent of the spool receiving space and of the holding recesses.

4. The spool valve as claimed in claim 1, wherein the housing parts are permanently coupled together.

5. The spool valve as claimed in claim 4, wherein the housing parts are permanently coupled by one of welding and bonding together.

6. The spool valve as claimed in claim 1, wherein the housing parts are detachably coupled by one of clips, screws or clamps.

7. The spool valve as claimed in claim 1, comprising seals fitted between the housing parts at the joints.

8. The spool valve as claimed in claim 1, wherein contact surfaces of the housing parts in engagement with one another are precision machined.

9. A spool valve as claimed in claim 8, wherein the precision machined contact surfaces of the housing parts are formed by lapping.

10. The spool valve as claimed in claim 1, wherein the housing parts consist of synthetic resin.

11. The spool valve as claimed in claim 1, wherein lateral limiting surfaces of the holding recesses are at least in part provided on radial projections which extend radially into the spool receiving space and in the peripheral direction or the spool receiving space, which projections in the assembled state of the housing parts constitute annular structures, an annular radial cutout being present between axially adjacent limiting surfaces of two adjacent holding recesses, a valve duct, which extends through the valve housing, opening into such radial cutout.

12. The spool valve as claimed in claim 1, wherein the respective sealing ring consists of an annular sealing body formed from an elastomeric material.

13. The spool valve as claimed in claim 1, comprising a disk-like centering part inserted coaxially in one of the spool receiving space and at least one housing space coaxially adjoining the spool receiving space, which centering part is provided for alignment between the housing parts.

14. A spool valve as claimed in claim 13, wherein the disk-like centering part comprises an end housing cover for the valve housing.

15. The spool valve as claimed in claim 1, wherein the housing parts including the holding recesses are formed by moldings.

16. The spool valve as claimed in claim 1, wherein the valve housing consists of two housing parts and at both ends has a respective housing cover.

17. The spool valve as claimed in claim 1, wherein axially on either side of the spool receiving space there is a housing space to accommodate a control element functioning to operate the valve, such space being arranged in one of the interior of the divided valve housing and an additional housing arranged at the end of the valve housing.

18. The spool valve as claimed in claim 1 wherein the valve ducts opening into the spool receiving space only run in one of the housing parts.

19. The spool valve as claimed in claim 1, wherein on at least one end side of the valve housing there is a housing opening permitting access to the spool receiving space after assembly of the longitudinal housing, said housing opening adapted to be shut off by a housing cover, the housing cover including an additional housing which receives a control element functioning for actuating the valve.

20. The spool valve as claimed in claim 1, wherein the individual sealing rings each have a sealing body of elastic material, which is provided with a support ring.

* * * * *